United States Patent [19]

Valavaara

[11] Patent Number: 4,619,166
[45] Date of Patent: Oct. 28, 1986

[54] DOUBLE-BLADED POWER HACKSAW

[75] Inventor: Viljo K. Valavaara, Ontario, Canada

[73] Assignee: Colic Machine & Tool Limited, Woodstock, Canada

[21] Appl. No.: 694,774

[22] Filed: Jan. 25, 1985

[51] Int. Cl.⁴ ............................................. B23D 49/02
[52] U.S. Cl. ........................................ 83/461; 83/556; 83/620; 83/639; 83/751; 83/775
[58] Field of Search ................. 83/513, 519, 555, 556, 83/581, 582, 639, 746–760, 768–784, 786, 647, 427, 618, 620, 624, 461

[56] References Cited

U.S. PATENT DOCUMENTS

| | | | |
|---|---|---|---|
| 271,740 | 2/1883 | Root | 83/647 X |
| 552,963 | 1/1896 | Lomas | 83/776 X |
| 680,136 | 8/1901 | Evered | 83/639 X |
| 2,068,201 | 1/1937 | Shurtz | 83/647 X |
| 2,182,289 | 12/1939 | Eisenlohr | 83/786 X |
| 2,412,311 | 12/1946 | Ziska | 83/518 X |
| 3,487,863 | 1/1970 | Buckley | 83/581 X |
| 3,901,116 | 8/1975 | Broccardo et al. | 83/776 X |

Primary Examiner—James M. Meister
Attorney, Agent, or Firm—George A. Rolston

[57] ABSTRACT

A hacksaw apparatus, for use in association with a work piece and a source of pressurized hydraulic fluid, wherein the hacksaw apparatus comprises a frame, adaptable to receive and support the work piece, hydraulic cylinders mounted to the frame, and connectable to the source of pressurized hydraulic fluid, a hacksaw support structure attached to the hydraulic cylinders, whereby operation of the hydraulic cylinders may move the hacksaw support structure relative to the frame, at least one hacksaw slidably mounted to the hacksaw support structure, hacksaw operators operable to move the hacksaw against the work piece and to maintain pressure between the hacksaw and the work piece during a hacksaw cutting stroke.

15 Claims, 9 Drawing Figures

DOUBLE-BLADED POWER HACKSAW

NATURE OF THE INVENTION

The invention relates to sawing apparatus and, in particular, to apparatus for sawing metal bars.

BACKGROUND OF THE INVENTION

Precision cutting of metal bars is usually carried out by means of a hacksaw, which is power operated by any suitable power source, and reciprocates to and fro.

This cutting method is slow and costly, and may be limited as to the depth of cut that can be made.

However, the speed of cutting is restricted by the type of metal, and its hardness, and also by the physical limitations of the hacksaw blade itself.

Clearly, it is desirable as far as possible to speed up the rate of cutting of such metal bars, provided this can be done without loss of accuracy.

Typically, known hacksaw apparatuses are driven by an engine or motor operating through a mechanical transmission means. When the hacksaw blades of such apparatuses contact a workpiece, the force of the blade against the workpiece varies throughout the stroke. The speed of the blade also varies througout the stroke. In order to apply a more constant force to the workpiece and to move the blade at a more constant speed, bulkier, and heavier and more complex transmissions would be required.

Furthermore, the return stroke of a hacksaw blade during which no cutting takes place generally takes the same amount of time as the cutting stroke. The maximum speed of the blade during the cutting stroke is pre-determined by factors such as the blade design, workpiece material and cutting lubricant. Thus, in order to increase the speed of operation of the hacksaw apparatus, only the speed of the blade during the return stroke may be increased. However, in order to achieve such function, the transmission must again be made bulkier, heavier and more complex.

Of course, such increases in the size and weight of the hacksaw apparatus add further cost to the machine. As well, surrounding support structure, such as a machine foundation, may have to be provided with increased capacity, also at additional cost.

A further disadvantage of known hacksaw apparatuses is that the stroke length of a hacksaw blade is fixed. Thus, for workpieces of varying heights only a portion of the available blade length may be utilized in cutting operations. Such limitation results in excess wear of a blade in particular areas and of reduced blade life. In order to overcome this disadvantage, further weight, bulk, complexity and expense would be required in the transmission means.

Finally, most known hacksaw apparatuses include only a single hacksaw, operable therefore only to cut a workpiece from one side only. Such devices are relatively slow in operation because they can only cut from one side. Known hacksaw apparatuses having two hacksaws are very bulky and heavy. The mechanical complexities of single hacksaw machines are compounded by having two opposed hacksaws.

The invention thereforeprovides two essentially parallel spaced apart hacksaw blades, mounted on reciprocating support means in opposition to one another, which can be operated simultaneously so as to cut a bar from both sides at once.

In accordance with a further objective of the invention, a table is provided adjacent to such saw blades and frames, and clamping means are provided for clamping a work piece on the table.

More specifically, the invention provides two such saw frames, slidable guide means for sliding such saw frames towards and away from one another, said slidable guide means being reciprocable in a plane normal to the plane of such sliding movement, and power operated means for reciprocating said guide means and frame means in unison relative to a work piece.

More specifically, the power operated means will comprise at least two, and preferably four, hydraulic cylinders, and mechanical linkage means connected with said four cylinders and with said slidable guide means, whereby to equalize movement of said slidable guide means in response to operation of said cylinders.

More specifically, the invention provides a saw apparatus having the foregoing advantages in which the slidable guide means for guiding the blade frames are slidable towards and away from one another, by power operated means, such power operated means being mounted on said slidable guide means, and being reciprocable in association therewith.

Consequently, it would be advantageous to provide a double hacksaw apparatus, the blades of which are operable to apply a relatively constant force to a workpiece during a cutting stroke. Furthermore, such blades ought preferably to have a more constant velocity during the cutting stroke in order to increase the overall speed of the cutting operation and in order to improve the efficiency of the cutting stroke. Such advantages should be obtained, if possible, without adding to the bulk, weight or expense of the hacksaw apparatus.

It would also be advantageous, if the speed of the return stroke of the hacksaw apparatus could be increased, again without adding to bulk, weight or cost.

Similarly, it would also be advantageous to provide a hacksaw apparatus operable to use the full available length of a hacksaw blade, in order to improve cutting operation and blade life.

STATEMENT OF THE INVENTION

With a view to overcoming the above disadvantages and to providing the above advantages, the invention comprises:

a hacksaw apparatus, for use in association with a work piece and a source of pressurized hydraulic fluid, wherein the hacksaw apparatus comprises a frame, adaptable to receive and support the work piece, hydraulic cylinder means mounted to the frame, and connectable to the source of pressurized hydraulic fluid, hacksaw support structure attached to the hydraulic cylinder means, whereby operation of the hydraulic cylinder means may move the hacksaw support structure relative to the frame, at least one hacksaw slidably mounted to the hacksaw support structure, hacksaw movement means operable to move the hacksaw against the work piece and to maintain pressure between the hacksaw and the work piece during a hacksaw cuting stroke.

The hacksaw apparatus according to the invention achieves the above advantages by providing a double hacksaw arrangement, having two hacksaws operable to cut a workpiece from opposite sides with precision. Hydraulic power cylinders are provided to reciprocate the hacksaws, back and forth through each stroke. Other hydraulic cylinders are provided to force the hacksaw blades against the workpiece with a uniform, optimum pressure during a cutting stroke. The hydraulic system includes a pump, operable to deliver a high pressure hydraulic fluid to the hydraulic power cylinders. The pump is operable by a suitable control mechanism to provide a relatively high flow during the return stroke and a relatively low flow during the cutting stroke. Thus, the hacksaws' return stroke is faster than the cutting stroke.

Furthermore, a clamping mechanism is provided to allow for a variable stroke length of the hacksaws. A limit switch means is attached to a clamp which holds the work piece. As the heights of various work pieces change, the clamp holding them moves up and down. Accordingly, the limit switch means, operable to control the lowermost motion of the hacksaws, moves up and down as well. The hacksaws thus move up and down sufficiently, whereby the full length of the blade is used in each cutting stroke.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
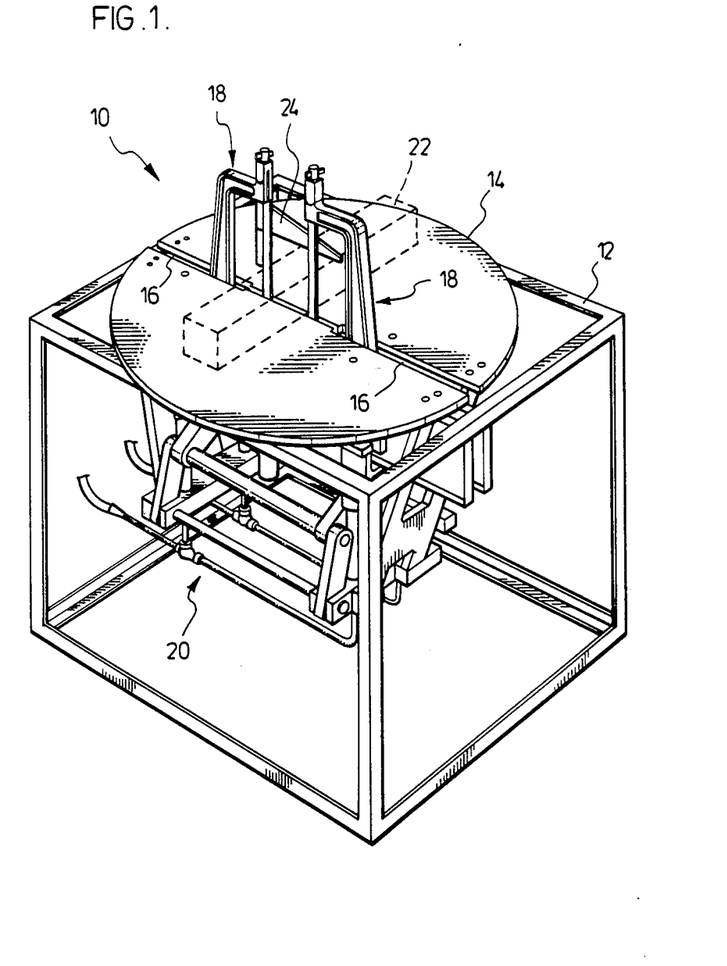
FIG. 1 is a perspective illustration showing the sawing apparatus according to the invention mounted on a frame.

Referring to FIG. 1, there is illustrated a hacksaw apparatus 10 according to the invention. Hacksaw apparatus 10 comprises a frame 12 to which is rotatably mounted work table 14. Table 14 is mounted to frame 12 by any suitable means (not shown) to achieve such rotatability. Preferably, table 14 is rotatable for at least 45° in either direction from a pre-determined position. Suitable table clamping means (not shown) may be used to secure table 14 in a particular selected angular position. Table 14 conveniently defines a circular shape. Table 14 defines slots 16. At least one hacksaw 18 extends upwardly through slots 16. In the illustrated embodiment, a pair of opposed hacksaws 18 are shown. Hacksaws 18 are each mounted to hydraulic reciprocating apparatus, indicated generally as 20, beneath table 14. Slots 16 are wide enough to allow hacksaws 18 to reciprocate back and forth therein. Slots 16 may have different widths at different positions, according to the width of the portion of the hacksaw therein. Hacksaws 18 are slidable back and forth on reciprocating apparatus 20 in order to accommodate workpieces of different widths. Accordingly, slots 16 must define a suitable width to allow such sliding movement. It is possible (as shown in FIG. 1) that the slots 16 associated with each hacksaw 18 may join together, thereby defining two halves of table 14 separated by a gap.

A work piece 22 (shown in Phantom) is clamped in place on table 14 between hacksaws 18. FIG. 1 illustrates the use of table clamp 24 for securing the work piece 22 to table 14. Other clamping means may also be used. Table clamp 24 as illustrated provides certain advantages, discussed below, when used in association with reciprocating apparatus 20.

To ensure maximum flexibility in manufacturing operations, a separate work piece feeding apparatus (not shown) may be located adjacent to hacksaw apparatus 10. Such work piece feeding apparatus may be operable to feed a long or continuous work piece 22 to hacksaws 18 after completion of a first hacksaw cutting operation for a second or subsequent cutting operation.

Figure 2:
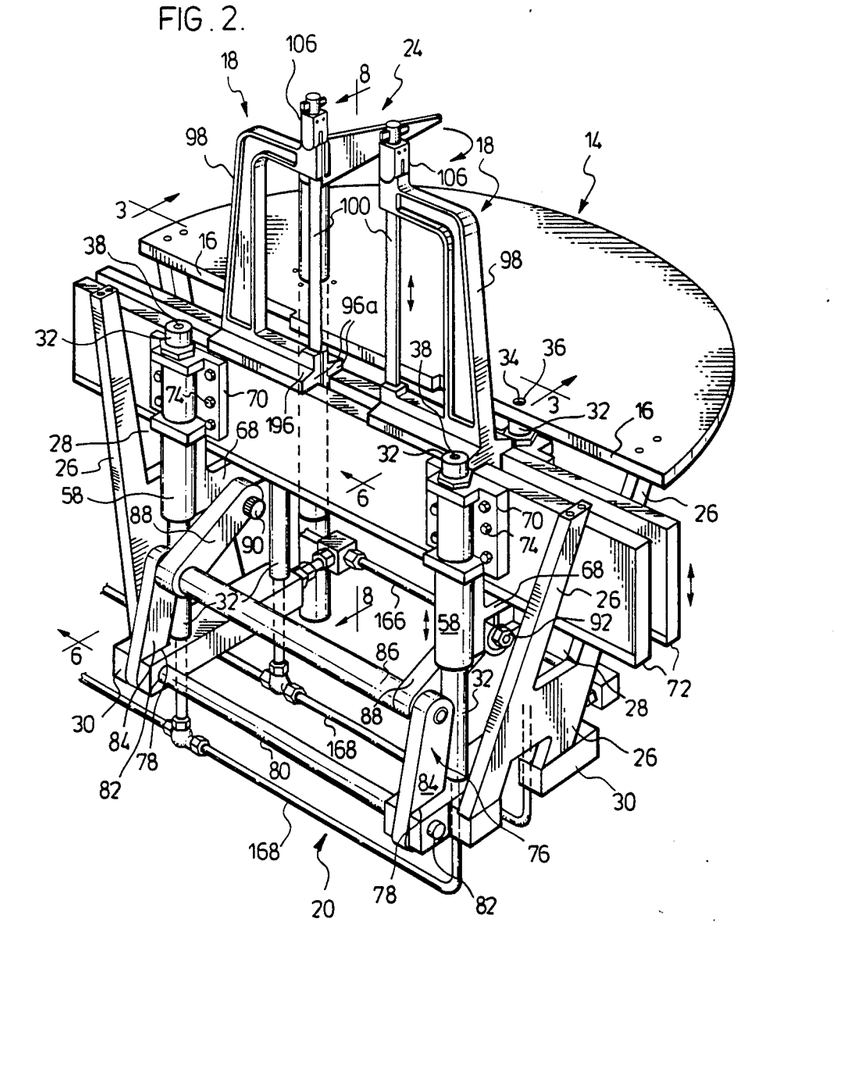
FIG. 2 is a cut-away perspective illustration showing the sawing apparatus according to the invention.

Referring to FIG. 2, hydraulic reciprocating apparatus 20 is shown in more detail. Only one half of table 14 is illustrated. Affixed to table 14 on each side of slot 16 and depending generally downwardly are end support members 26. Each end support member 26 defines a U-shaped slot 28 at its upper end. Slots 28 are thus disposed directly beneath slots 16. Mounted to the lower ends of support members 26 are transverse cross members 30. Each cross member 30 defines a manifold chamber 46, communicating with the outside of cross member 30 (see FIG. 6).

Extending vertically from each transverse cross member 30 are a pair of rods 32. The tops of rods 32 are each affixed to table 14 and evenly disposed on opposite sides of slot 16.

In the illustrated embodiment, a rod 32 is affixed to table 14 by means of a bolt 34 passing through a counter sunk hole 36 defined in a table top 14 into a threaded hole 38 defined along the axis of a rod 32 at its upper end.

Figures 6, 7:
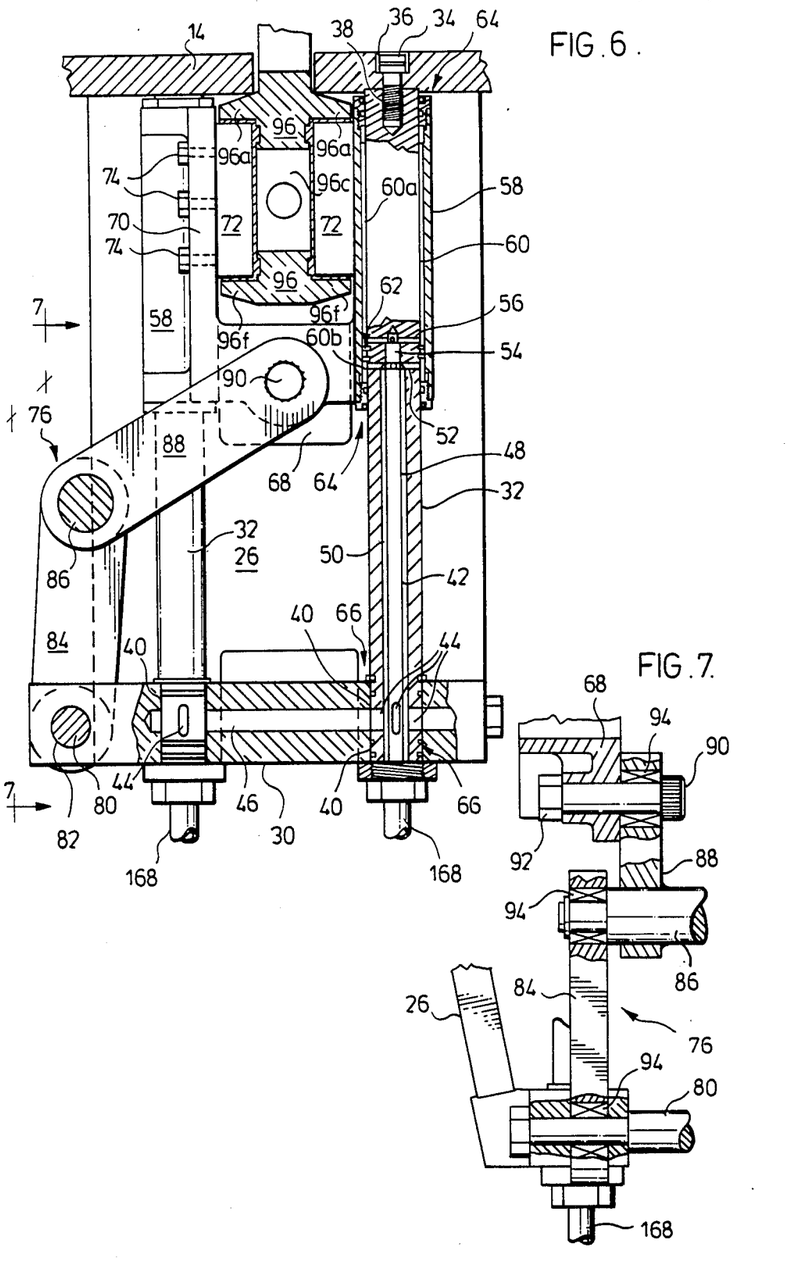
FIG. 6 is a view in partial section along the line 6—6 of FIG. 2.
FIG. 7 is a view along the line 7—7 of FIG. 6.

Referring to FIG. 6, the bottom end of a rod 32 is inserted and affixed within a hole 40 defined through cross member 30 and communicating with manifold chamber 46. The bottom end of rod 32 defines an axial bore 42 extending from the bottom of rod 32 approximately half way up along its length. The walls of rod 32 near the bottom of rod 32 define at least one aperture 44 whereby communication is allowed between bore 42 and the manifold chamber 46 defined within cross member 30. Manifold chamber 46 extends transversely from one side of cross member 30 by a first rod 32 to the second rod 32. Manifold chamber 46 and axial bores 42 are sealed around rod 32 by suitable seal means 66.

Extending vertically along the axis of bore 42 is hollow tube 48. An annular chamber 50 is defined between the walls of tube 48 and of rod 32. Annular chamber 50 communicates with the exterior of rod 32 via bores 52 adjacent the top of bore 42. The top of bore 42 defines a tube receiving socket 54 within which tube 48 is received and sealed. The interior of tube 48 communicates with the exterior of rod 32 via bore holes 56 defined through rod 32 above tube 48 or through rod 32 and tube 48 at socket 54.

Slidably mounted to the exterior of rods 32 are hydraulic cylinders 58. An annular chamber 60 is defined between cylinder 58 and rod 32. Annular chamber 60 is divided into two parts, being an upper part 60a and a lower part 60b. Chamber parts 60a and 60b are separated by a suitable annular piston/seal 62. Bore holes 56 communicate with upper chamber 60a and bore holes 52 communicate with lower chamber 60b. Cylinders 58 are sealed at each end by suitable seal means, indicated generally as 64.

Referring again to FIG. 2, Lower portions of pairs of cylinders 58 are rigidly connected together by means of a generally U-shaped hanger member 68. Affixed to the upper portion of each cylinder 58 is a mounting bracket 70. Longitudinal pairs of brackets 70 are each mounted to a hacksaw support plate 72, having a generally horizontal upper edge, whereby two hacksaw support plates 72 are mounted to brackets 70 in spaced apart parallel relationship. Plate 72 may be affixed to a bracket 70 by any suitable means, such as by bolts 74. Plates 72 may be attached together by suitable spacer members (not shown) located at pre-determined specific locations, whereby such spacer members will not interfere with the operation of hacksaw apparatus 10, as described below.

Referring to FIGS. 2, 6 and 7, in order to ensure that the hydraulic reciprocating apparatus 20 operates generally vertically, a synchronizing link mechanism, indicated generally as 76, is provided. Such a snchronizing link mechanism 76 is operable to ensure that hydraulic cylinders 58 operate to move reciprocating apparatus 20 generally evenly and vertically, maintaining the upper edges of plates 72 in a generally horizontal position. One end of transverse cross members 30 defines a vertical slot 78. An axle rod 80 extends from one cross member 30 to the other and through slots 78 by holes 82 defined in members 30 for the purpose. Swingably mounted to axle rod 80 within slot 78 is a lower link 84. Lower links 84 are swingably joined at an upper end to a synchronizing link rod 86. Rigidly mounted to synchronizing link rod 86 adjacent lower links 84 are upper links 88. A second end of upper links 88 is swingably mounted to hanger member 68. Such swingable mounting may be achieved by means of a dowel pin 90 and nut 92. As shown in FIG. 7, it will be appreciated that upper and lower links 88 and 84, respectively, may be provided with bearings 94 for ease of swingability.

Figure 3:
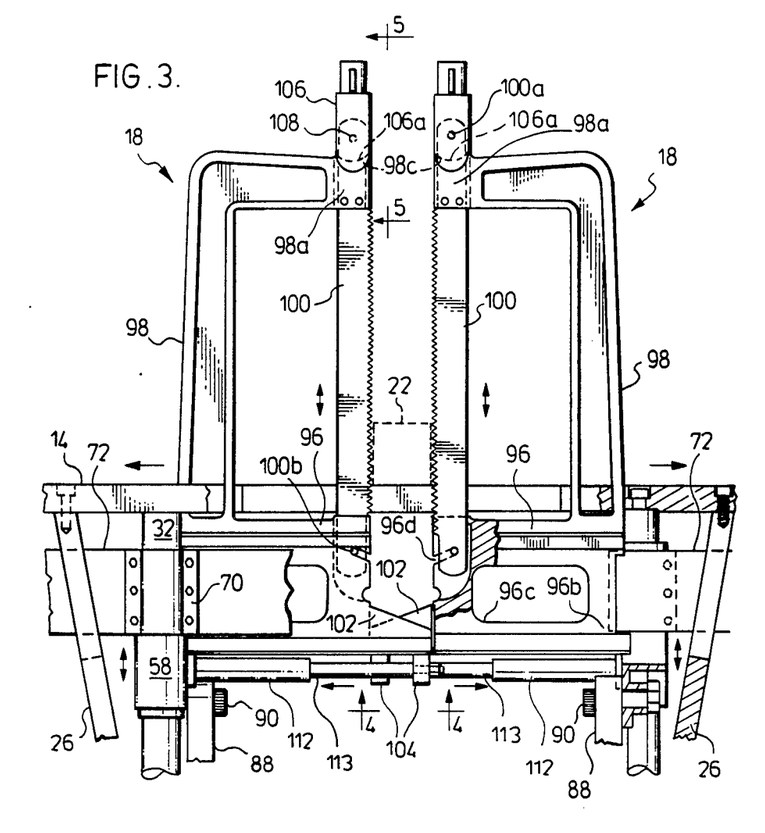
FIG. 3 is a partially sectioned side elevational view along the line 3—3 of FIG. 2 of the hacksaw blades according to the invention.

Referring to FIGS. 2 and 3, hacksaws 18 are slidably mounted between hacksaw support plates 72. Each hacksaw 18 comprises a base portion 96 from which extends a bow portion 98 and a hacksaw blade 100 extending between the base portion 96 and a bow portion 98. The base portion 96 defines two horizontal flanges 96a, slidably supported on the upper edges of hacksaw support plates 72. Base portion 96 also defines a guide portion 96b, depending downwardly from flanges 96a between hacksaw support plates 72. Guide portion 96b may define holes 96c whereby material may be saved without loss of structural strength or stiffness. Base portion 96 defines a working or forward side of hacksaw 18, adjacent work piece 22. Base portion 96 also defines two lower horizontal flanges 96f, adapted to fit beneath lower edges of plates 72.

Figure 4:
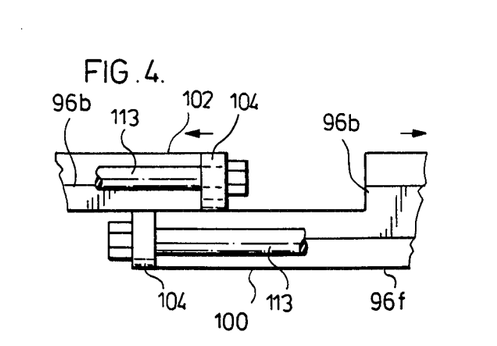
FIG. 4 is a detailed view along the line 4—4 of FIG. 3.

Extending forwardly from the bottom of base portion 96 is extension arm 102. Depending downwardly from a forward end of arm 102 is hydraulic cylinder mount 104. It will be appreciated that because extension arms 102 extend away from the working edge of hacksaws 18, in the event that a small diameter work piece 22 is being cut (in other words, the working edges of hacksaws 18 are close together), arms 102 of each hacksaw 18 might interfere with each other to prevent the proper closing of hacksaw blades 18 on work piece 22. In order to avoid this problem, extension arms 102 on opposed hacksaws 18 are disposed to one side of each other (see FIG. 4).

Base portion 96 further defines a suitable slot means 96d adaptable to receive and support a lower end of a hacksaw blade 100. In addition, base portion 96 may also define a generally vertical slot 96e in communication with slot means 96d, whereby blade 100 may be supported in a generally vertical position.

Extending upwardly from the rear of base portion 96 is a bow portion 98. Bow portion 98 comprises an inverted generally L-shaped member, conveniently having an H-shaped cross section. A forward portion of bow 98 defines a blade seating portion 98a, vertically aligned with slots 96d and 96e. Blade seating portion 98a defines a vertical slot 98b. The upper part of blade seating portion 98a defines a cylindrical concave surface 98c.

Figure 5:
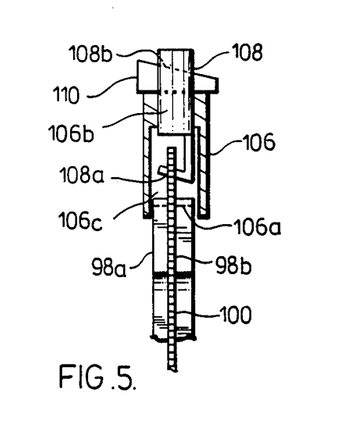
FIG. 5 is a detailed view along the line 5—5 of FIG. 3.

Referring to FIGS. 3 and 5, blade holder 106 is adapted to seat on a blade seating portion 98a. For this purpose, blade holder 106 defines a cylindrical convex surface 106a adapted to cooperate with concave surface 98c. A vertical hole 106b is defined in blade holder 106. Furthermore blade holder 106 defines a vertical slot 106c extending into communication with hole 106b from convex surface 106a. Fitted within hole 106b is a blade mount member 108. At its lower end, disposed within slot 106c, blade mount member 108 defines a blade receiving stud 108a. Blade mount member 108 further defines at its upper end disposed at least partially above blade holder 106 a transverse aperture 108b. Wedge 110 is fitted within transverse aperture 108b and is adapted to wedge blade mount member 108 upwardly relative to blade holder 106.

A known hacksaw blade 100 defining a hole 100a at an upper end and a transverse cross piece 100b at a lower end is supported between bow 98 and base 96. Particularly, blade receiving stud 108a passes through hole 100a and cross piece 100b is fitted within slot 96d. Blade 100 is thus oriented essentially vertically through slots 96e, 98b and 106c.

The above described blade mounting arrangement is well known and has been described only in order to facilitate understanding of one embodiment of the invention. It will be appreciated that other blade mounting arrangements may be used without departing from the spirit and scope of the invention.

In order to slide hacksaws 18 along hacksaw support plates 72, hydraulic cylinders 112 having operating rods 113 are mounted between hanger members 68 and hydraulic cylinder mounts 104.

Figure 8:
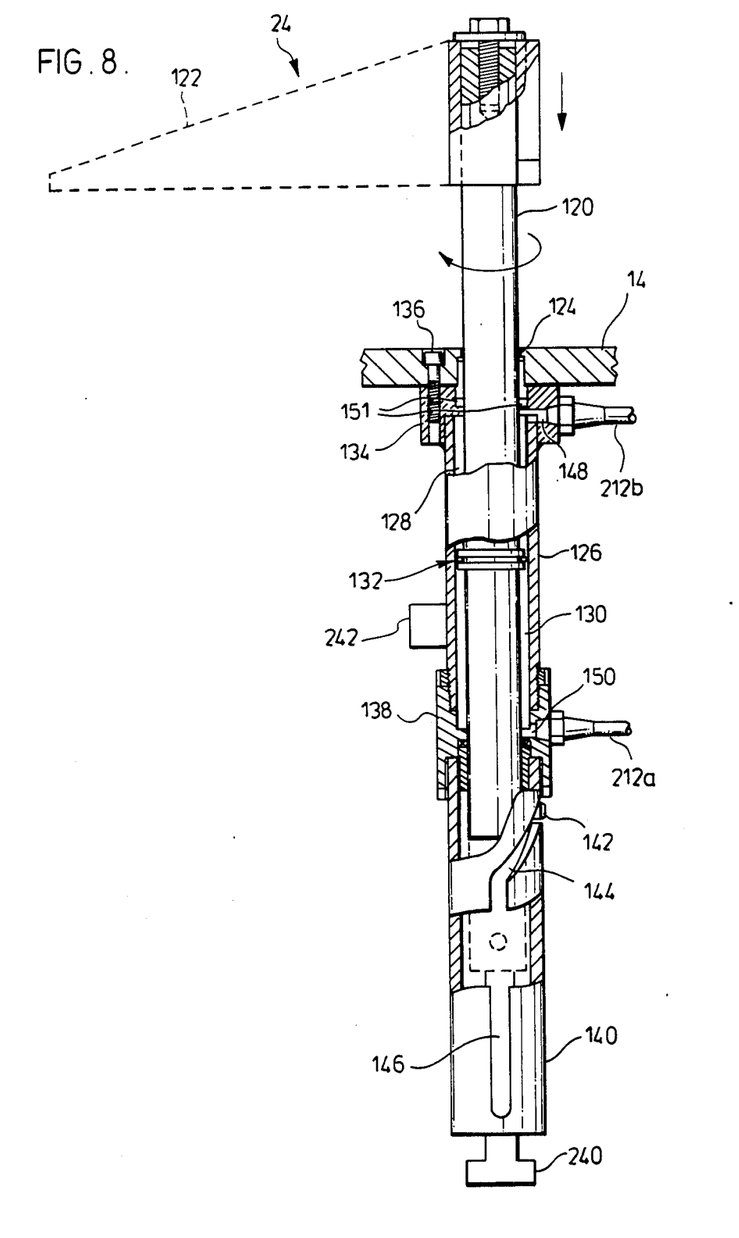
FIG. 8 is a view of the clamping apparatus according to the invention along the line 8—8 of FIG. 2, and, FIG. 9 is a schematic view of the hydraulic system according to the invention.

In order to securely hold work piece 22 to table 14, a table clamp 24 is provided. Referring to FIG. 8, clamp 24 comprises a rotatable shaft 120 to which is attached a clamping arm 122. Shaft 120 extends downwardly through a hole 124 in table 14 into a hydraulic cylinder 126. An upper annular chamber 128 is defined between shaft 120 and cylinder 126. Similarly, a lower annular chamber 130 is also defined between shaft 120 and cylinder 126. Upper and lower chambers 128 and 130 are separated by suitable piston/sealing means 132.

The upper end of cylinder 126 is affixed to seating member 134, which in turn is affixed (in the illustrated embodiment by means of bolts 136) to table 14. A lower end of cylinder 126 is threaded to sleeve 138. Shaft 120 extends through sleeve 138 into the interior of a tube 140. The upper end of tube 140 is also threaded or otherwise connected to sleeve 138. Extending radially outwardly from the bottom of shaft 120 is pin 142. Pin 142 extends into a curved or angled slot 144 defined in the walls of tube 140. Slot 144 extends both longitudinally along and around at least a portion of, and preferably about 90° around, the circumference of tube 140. The lower end of curved slot 144 joins with the upper end of a longitudinal slot 146 extending downwardly along the side of tube 140.

Upper annular chamber 128 communicates with the outside of seating member 134 by means of a bore hole 148 defined in seating member 134. Similarly, lower annular chamber 130 communicates with the outside of sleeve 138 by means of a bore hole 150 defined in sleeve 138.

Chambers 128 and 130 are sealed adjacent an upper and a lower end, respectively, against shaft 120 by suitable seal means, indicated generally as 151.

A lower limit switch means, indicated schematically as 240, may be attached to shaft 120. A suitable arm or portion (not shown) of reciprocating apparatus 20 may extend therefrom, whereby lower limit switch 240 may be contacted during the downstroke of assembly 20. It will be appreciated that physical contact may not be necessary, and that any position transducer operable to deliver a signal corresponding to the lowermost position of apparatus 20 in its downstroke may be used. Attachment of lower limit switch means 240 to shaft 120 renders it movable relative to work piece 22, for reasons to be discussed.

Alternatively, a fixed lower limit switch means may be used.

Similarly, a fixed upper limit switch means, indicated schematically as 242, may be fixed relative to frame 12, table 14, and cylinder 126.

Figure 9:
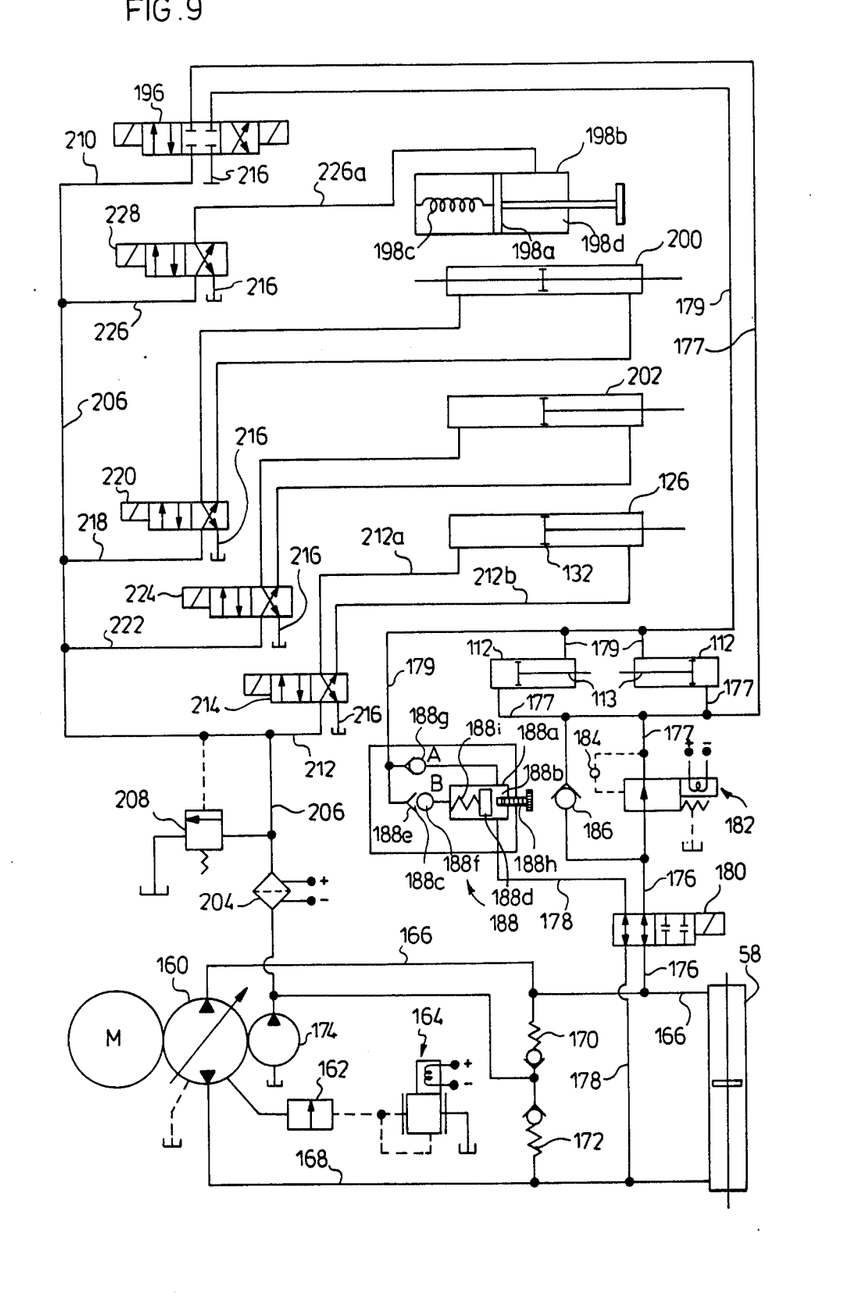

Referring to FIG. 9, a hydraulic operating system to control the operation of the hacksaw apparatus 10 is illustrated. A two directional pump 160 is driven by motor M to provide a source of high pressure hydraulic fluid. The output of the pump 160 is controlled by a regulating valve 162. The positioning of a regulating valve 162 is controlled by a suitable electrical or electronic control means indicated generally as 164. A control signal may be inputted to the electronic control means 164 directly from a control device such as a computer or a manually pre-set resistor bank (not shown).

In one direction, the output of pump 160 is delivered to manifold 166 which is connected to manifold chambers 46 in cross members 30, and annular chamber 60*b* in hydraulic cylinder 58.

In the other direction, the output of pump 160 is directed to manifold 168 which is connected to tubes 48 and annular chambers 60*a* in hydraulic cylinders 58.

Pump 160, manifolds 166 and 168 and cylinder 58 comprise a closed loop system. However, in the event that some hydraulic fluid leaks out of the closed loop system, manifolds 166 and 168 are connected via check valves 170 and 172, respectively, to a loop charger pump 174, which is driven by motor M. Check valves 170 and 172 are selected or pre-set whereby in the event that the pressure in manifold 166 or 168 drops (as in the case of a loss of hydraulic fluid), valve 170 or 172, respectively, will operate to allow oil to flow from pump 174 into the manifold 166 or 168, as the case may be.

Manifolds 166 and 168 connect to hydraulic lines 176 and 178, respectively. Lines 176 and 178 after passing through regulating valves as described below, lead to the hacksaw hydraulic cylinders 112.

After leaving manifolds 166 and 168, lines 176 and 178, repectively, pass through a normally-open, four-way solenoid operating valve 180. In the normally open position, operating valve 180 allows hydraulic fluid in lines 176 and 178 to flow unhindered therethrough. However, in the event that valve 180 is closed, perhaps by operation of a solenoid, lines 176 and 178 are obstructed and fluid may no longer flow.

After leaving valve 180, line 176 passes through a blade pressure setting regulating valve, indicated generally as 182 to line 177. An electrical signal, corresponding to the proper blade pressure for cutting a particular material under the desired conditions, delivered from a computer or manually pre-set resistor banks (not shown) controls the positioning of valve 182. A pressure transducer means 184 provides feedback on the actual pressure in line 177. Valve 182 is operable whereby when the desired pressure has been achieved in line 177, valve 182 will close. A by-pass check valve 186 is provided around blade pressure valve 182, operable to allow fluid to flow from cylinders 112 back around valve 182.

After leaving operating valve 180, line 178 leads to metering check valve 188. Check valve 188 includes a valve body 188*a*, defining two chambers 188*b* and 188*c* separated by a slideable piston 188*d*. Chamber 188*b* is connected to line 178. The other chamber 188*c* is connected to outlet line 179 through valve seat 188*e*. Piston 188*d* defines a valve gate 188*f*, adaptable to seal and unseal against seat 188*e*, thereby opening and closing outlet line 179 to fluid flow. A check valve means 188*g* is provided whereby fluid may flow from outlet line 179 to line 178. A suitable biasing means, such as spring 188*i*, urges piston 188*d* into a pre-determined position minimizing the volume of chamber 188*b* and maximizing that of chamber 188*c*. An adjustment means, such as screw 188*h*, is provided to adjust such minimum and maximum volumes.

Lines 179 and 177 also connect to the output of a normally-closed, six-way solenoid manual setting valve 196. Manual setting valve 196 is part of a hacksaw utility hydraulic system which is used to operate accessory devices which provide for the convenient operation of the hacksaw apparatus 10. Loop charger pump 174 may be used to operate such utility system. This utility system may include, for example, the manual setting valve 196, the hydraulic cylinder 126 of clamp 24, a table brake 198, forward feed hydraulic cylinder 200 and perhaps a vice hydraulic cylinder 202. Each of manual setting valves 196, clamp cylinder 126, vice cylinder 202, forward feed cylinder 200 and table brake 198 are operated independently of each other.

The output of loop charger pump 174 passes through a filter 204 into a utility manifold 206. Utility manifold 206 is provided with a relief valve 208 operable to allow fluid to escape from manifold 206 in the event that the pressure in manifold 206 becomes too high.

Manual set up line 210 leads from manifold 206 to the input of manual setting valve 196. Manual setting 196 is interlocked with operating valve 180. Thus, only one of either valves 196 or 180 may be in an open position at any one given time. The other valve 196 or 180 is closed. In an open position, manual setting valve 196 is operable to allow line 210 to communicate either with line 177 or with line 179. The other line 177 or 179 is open to a drain 216.

Clamp line 212 leads from manifold 206 to clamp operating valve 214. Clamp valve 214 is a four-way solenoid valve whereby line 212 may communicate with either side of piston seal 132 within cylinder 126. Simultaneously, the other side of piston seal 132 is open to a drain 216.

Similarly, a forward feed line 218 leads from manifold 206 to forward feed operating valve 220, a four-way solenoid valve. Also a vice line 222 leads from manifold 206 to vice operating valve 224, a four-way solenoid valve. Both forward feed cylinder 200 and vice cylinder 202 are connected to their respective operating valves 220 and 224 in fashion similar to that in which clamp cylinder 126 connects to clamp operating valve 214.

Forward feed cylinder 200 is connected to a workpiece forward feed apparatus (not shown) and is operable to power same. Vice cylinder 202 is connected to a workpiece vice (not shown) in the forward feed apparatus for holding or clamping the workpiece.

A table brake line 226 connects to table brake operating valve 228. Line 226a from valve 228 connects to a hydraulic table brake 198 on the forward feed apparatus (not shown). Brake 198 includes a piston 198a slidable within cylinder 198b. A suitable biasing means, such as spring 198c, urges piston 198a outwardly where it may clamp against a forward feed table (not shown). A chamber 198d is defined between piston 198a and cylinder 198b, whereby pressurization of chamber 198d tends to urge piston 198a inwardly, thus releasing it from the table and allowing the forward feed table to be moved.

In operation, a work piece 22 of a particular material is selected. Hacksaw blades 100 are selected accordingly. The transverse cross pieces 100b of hacksaw blades 100 are inserted in slots 96d of base portions 96. The blade receiving stud 108a of blade mount member 108 is passed through hole 100a of hacksaw blades 100. Blade holder 106 is then seated on concave surface 98c of bow portion 98. Wedge 110 is then passed through transverse aperture 108b of blade mount member 108 and tapped into place so that blade 100 is tightly held in place.

Motor M is turned on to operate loop charger pump 174, thus pressurizing utility manifold 206 and manual set up line 210. Manual setting valve 196 is opened, whereby high pressure fluid enters line 179 and flows to hacksaw cylinders 112. Cylinders 112 operate to move hacksaws 18 away from each other. Work piece 22 is then placed between hacksaw blades 18. Because manual setting valve 196 is interlocked with operating valve 180, operating valve 180 is closed and no fluid may flow therethrough. Excess fluid in line 177 returns to valve 196 and to drain 216 through valve 196.

Work piece 22 is positioned on table 14 so that hacksaws 18 are lined up in order to make the desired cut. The four-way solenoid clamp operating valve 214 is operated to close clamp 24 on work piece 22, as described below. Manual setting valve 196 is moved to its alternate open position, whereby high presure fluid enters line 177 and flows to hacksaw cylinders 112. Cylinders 112 operate to move hacksaws 18 toward each other, until they are adjacent or contact work piece 22. Excess fluid in line 179 returns to valve 196 and to drain 216. Operating valve 180 remains closed.

The desired blade pressure, according to the material of work piece 22, the speed of operation of the hacksaw blades, the type of hacksaw blade, lubricant used and other factors, is pre-selected and entered either into the controlling computer or manually operated resistor banks (not shown).

Manual setting valve 196 is then closed, and simultaneously because of the interlock, operating valve 180 is opened. Excess fluid in line 179 flows through check valve 188g and operating valve 180 to manifold 168.

Motor M is operated to drive hydraulic pump 160, first pressurizing manifold 166. The pressurization of manifold 166 causes hydraulic fluid to pass into line 176 through operating valve 180 to blade pressure setting or regulating valve 182. As fluid flows through valve 182 into lines 177 and hydraulic cylinders 112, the pressure therein increases. Hacksaws 18 are forced by hydraulic cylinder 112 to close in opposed fashion on opposite sides of work piece 22. Blades 100 contact work piece 22 either at its original uncut surface or at the bottom of a previously made cut. As hydraulic fluid attempts to flow into lines 177 through valve 182, the pressure in lines 177 and hydraulic cylinder 112 increases, thus increasing the pressure of blades 100 against work piece 22. The pressure is monitored by pressure transducer 184, operable to deliver a mechanical force corresponding to the pressure to valve 182. Such force tends to open valve 182. Meanwhile, an electrical signal from the controlling computer or resistor bank (not shown) is delivered to a modulating coil in valve 182. Such signal tends to close valve 182. The voltage of this electrical signal corresponds to the desired blade pressure. Such voltage is sufficient to ensure that valve 182 remains closed when the actual pressure equals or is greater than the desired pressure. However, in the event that the actual pressure drops below the desired pressure, transducer 184 delivers force to valve 182 sufficient to open it against the force of the modulating coil. While valve 182 is open, more pressurized fluid can be delivered to cylinders 112 to increase the actual pressure to the desired pressure. At the desired pressure, the modulating coil operates to close the valve 182 again. When valve 182 is closed the hydraulic fluid in lines 177 and cylinders 112 is trapped and the pressure therein remains at the constant desired blade pressure.

It will be appreciated that other pressure transducers may be used in any suitable feedback control system for controlling the operation of valve 182.

Simultaneously, as the blades close upon the work piece, manifold 166 delivers high pressure hydraulic fluid to tubes 48 lying within rods 32. Such hydraulic fluid passes to manifold chamber 46 through apertures 44 into annular chamber 50 to bore holes 52, passing therethrough to lower annular chamber 60b. The hydraulic fluid applies pressure to seals 62 and 64 thereby causing the cylinders 58, reciprocating mechanism 20 and hacksaws 18 to move downwardly. The cutting operation of the hacksaws 100 thus occurs during the downstroke.

Hydraulic cylinder 58 continues downwardly until a lower limit switch means 240 is contacted. Lower limit switch 240 delivers a signal to the computer or resistor bank (not shown) which in turn will deliver a new signal to electronic control means 164 and regulating valve 162. Regulating valve 162 then causes the output of pump 160 to be directed to manifold 168.

High pressure fluid is then directed into line 178 and through operating valve 180 to chamber 188b of metering check valve 188. Pressurized fluid tends to close check valve 188g and to push piston 188d, whereby the contents of chamber 188c are pressurized and forced out into line 179.

High pressure fluid passes from metering check valve 188 through line 179 to hacksaw hydraulic cylinders 112. High pressure fluid enters hydraulic cylinders 112 and causes hacksaws 18 to move away from work piece 22. Because the volume of chamber 188c is limited to a pre-determined amount, i.e., before valve gate 188f seals against valve seat 188e, hacksaws 18 only move away from work piece 22 a limited, pre-determined distance. The pre-determined volume of chamber 188c may be adjusted and calibrated by moving adjustment screw 188h a pre-determined distance against moving piston 188d. Excess hydraulic fluid in line 177 is able to pass around blade pressure setting regulating valve 182 through check valve 186. Such excess hydraulic fluid is forced from line 177 into line 176 and into manifold 166 through operating valve 180.

High pressure fluid passes from manifold 168 into and up tubes 48 to boreholes 56, passing therethrough to upper annular chambers 60b. High pressure fluid acts on seals 62 and 64, thereby causing cylinder 58, reciprocating apparatus 20 and hacksaws 18 to move upwardly. Thus, during the upstroke, little or no pressure is applied to the work piece 22.

As described above, it can be seen that pressures are applied by hacksaws 18 to work piece 22 only during the downstroke. During the upstroke the pressure on the blades 100 is released and in fact the blades 100 may be moved away from work piece 22.

Cylinder 58 continues upwardly until an upper limit switch means 242 is contacted. Because lower limit switch means 240 is mounted to clamp 24, it can be assured that hacksaw blades 100 are used along their entire working length. In other words, if a work piece 22 of smaller height is used, clamp 24 will be in lower position than in the case of a higher work piece. Because of the lower position, limit switch means 240 will also be at a lower position. Consequently, cylinder 58, reciprocating apparatus 20 and hacksaws 18 will have to travel a farther downward distance to contact limit switch means 240.

In the event that hydraulic fluid leaks from manifolds 166 or 168 or lines 176 or 178, loop charger pump 174 will deliver replacement fluid through check valve 170 or 172, as may be required.

Loop charger pump 174 may also provide high pressure hydraulic fluid for use in the accessories or utility system of the hacksaw apparatus 10. In particular, with appropriate valves, pump 174 will provide high pressure hydraulic fluid to clamp cylinder 126, vice hydraulic cylinder 202, forward feed hydraulic cylinder 200 and table brake 198 as well as to manual setting valve 196. Pump 174 delivers pressurized fluid through filter 204 (where particulates may be removed from the fluid) into utility manifold 206. Utility manifold 206 is provided with a relief valve 208. If the pressure in manifold 206 becomes greater than a pre-determined maximum pressure, then relief valve 208 may operate to allow fluid to drain from manifold 206, thereby reducing the pressure therein below an acceptable level.

Manifold 206 also connects to clamp line 212 leading to clamp operating valve 214. Pressurized fluid may be directed by valve 214 into either line 212a or line 212b, the other line 212b or 212a (not receiving the pressurized fluid) being open to drain 216. Such pressurized fluid may be used to operate clamp 24. Line 212a connects to sleeve 138 in communication with bore hole 150. Consequently, if clamp valve 214 is moved to one particular position, fluid is pressurized in line 212a and bore hole 150. High pressure fluid may therefore be introduced through bore hole 150 into lower annular chamber 130. The high pressure fluid acts upon piston/seal 132 thereby causing shaft 120 and clamping arm 122 to move upwardly, away from work piece 22. In this position pin 142 is at a maximum upward position within slot 144, and prevents further upward movement of shaft 120 and arm 122. When it is desired to clamp the work piece 22, clamp valve 214 is moved to its other position, thereby introducing a high pressure fluid through line 212b and bore hole 148 to upper annular chamber 128. The high pressure fluid acts downwardly against piston seal 132, thereby causing shaft 120 and arm 122 to move downwardly. Excess fluid in lower annular chamber 130 passes through bore hole 152, line 212a and valve 214 to drain 216. As shaft 120 moves downward pin 142 is constrained to move within slot 144. Thus, as shaft 120 moves downwardly, pin 142 not only moves downwardly but also circumferentially thereby causing shaft 120 and arm 122 to rotate. Slot 144 is defined such that shaft 120 and arm 122 only rotate about 90°. In such position, arm 122 is positioned transversely across work piece 22. As shaft 120 continues to move downwardly, pin 142 becomes constrained to move within longitudinal slot 146. Therefore, shaft 120 and arm 122 may move downwardly without additional rotation, until arm 122 contacts work piece 22. The pressure exerted by arm 122 against work piece 22 counterbalances the pressure exerted by the hydraulic fluid against piston seal 132.

Similarly, manifold 206 connects to vice line 222 which connects to vice operating valve 224. Lines leading from valve 224 to vice hydraulic cylinder 202 provide for operation of a vice (not shown) similar to that of clamp 24.

Similarly, a forward feed operating valve 220 may be operated to move the work piece relative to the hacksaws 18 in either direction as required for additional hacksaw cutting operations. High pressure fluid leaves manifold 206 and enters line 218. Fluid from line 218 passes through forward feed operating valve 220 and passes to forward feed hydraulic cylinder 200. Operation of the forward feed hydraulic cylinder 200 is identical to that of hydraulic cylinder 126 and vice hydraulic cylinder 202.

Additionally, utility manifold 206 connects to table brake line 226 and delivers high pressure hydraulic fluid therethrough to table brake valve 228. Normally, valve 228 is closed to high pressure fluid flowing from manifold 206. However, in the event that the brake 198 must be released, valve 228 may be opened to allow high pressure fluid to flow into table brake 198. High pressure fluid causes the piston 198 of brake 198 to retract, thus releasing the brake.

It will be appreciated that because manual setting valve 196 and operating valve 180 are interlocked with each other high pressure fluid may be delivered to hacksaw cylinders 112 either through the one valve 196 or the other valve 180. It is not possible for both valves to deliver high pressure fluid to the hacksaw cylinders 112 at the same time.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A hacksaw apparatus, for use in association with a work piece and a source of pressurized hydraulic fluid, wherein the hacksaw apparatus comprises:

a frame, adaptable to receive and support the work piece;

two hydraulic cylinder means mounted on said frame, and connectable to said source of pressurized hydraulic fluid, each said cylinder means including a cylinder and piston rod, said piston rod extending through both ends of said cylinder and whereby said cylinder is slidably mounted on said piston rod;

two hacksaw support structures connected to respective said hydraulic cylinder means, whereby operation of a said hydraulic cylinder means moves a said hacksaw support structure relative to said frame;

a hacksaw mounted on each said hacksaw support structure, and, in opposition to one another and, and operable to cut against opposite sides of said work piece; and, hacksaw movement means operable to move each said hacksaw against said work piece from opposite sides and to maintain pressure between each said hacksaw and said work piece during a hacksaw cutting stroke.

2. A hacksaw apparatus as claimed in claim 1 wherein said frame includes a rotatable work table, and said hydraulic cylinder means are attached to said table.

3. A hacksaw apparatus as claimed in claim 2 wherein each said cylinder and rod define therebetween an upper annular chamber and a lower annular chamber, said chambers being separated from each other by first sealing means fixed to said rod and each chamber being sealed at an opposite end by second sealing means fixed to said cylinder said piston rod defining passageways whereby pressurized hydraulic fluid may be directed to said upper annular chamber and said lower annular chamber, as may be selected, and wherein an upper end of said piston rod is attached to said rotatable work table and a lower end of said piston rod is connected to structural members which are connected to the rotatable work table.

4. A hacksaw apparatus as claimed in claim 3 wherein piston rod defines a longitudinal bore extending from the lower end of said rod to a point adjacent the first sealing means, the longitudinal bore having a hollow tube extending from end to end of the bore, walls of the bore and of the tube defining an annular manifold therebetween, the annular manifold communicating via passageway means in said rod with the lower annular chamber, and the hollow interior of the tube communicating via further passageway means in said rod with the upper annular chamber.

5. A hacksaw apparatus as claimed in claim 4 including four said hydraulic cylinders.

6. A hacksaw apparatus as claimed in claim 5 wherein the structural members include two transverse cross members, each cross member being associated with a pair of said hydraulic cylinders, the lower end of each said piston rod being fixed within a hole extending through a said cross member, each cross member defining a manifold chamber and each said rod defining apertures, whereby manifold chambers are in communication with respective annular manifolds, and wherein conduit means are connected to each cross member whereby a conduit means is in communication with the manifold chamber and other conduit means are in communication with the hollow interior of said tubes of respective hydraulic cylinders.

7. A hacksaw apparatus as claimed in claim 6 wherein a synchronizing link apparatus is connected to said structural members between longitudinal pairs of the said hydraulic cylinders whereby uneven operations of the hydraulic cylinders is hindered.

8. A hacksaw apparatus as claimed in claim 7 wherein the hacksaw support structure includes a hanger member attached to each cross member adjacent transverse pairs of cylinders and a pair of parallel, spaced apart hacksaw support plates affixed to the hanger members.

9. A hacksaw apparatus as claimed in claim 8 wherein the synchronizing link apparatus comprises a lower link swingably mounted to each transverse cross member, a synchronizing link rod swingably connected to upper ends of each lower link, and an upper link rigidly mounted to the snchronizing link rod adjacent each lower link, upper ends of each upper link being swingably mounted to a hanger member.

10. A hacksaw apparatus as claimed in claim 9 wherein the hacksaws are slidably supported on and between upper edges of the support plates.

11. A hacksaw apparatus as claimed in claim 10 wherein the hacksaw movement means includes hacksaw hydraulic cylinders, connected between each hacksaw and a hanger member and connectable to the source of pressurized hydraulic fluid.

12. A hacksaw apparatus as claimed in claim 11 including a hydraulic clamp means for securing the work piece to the table.

13. A hacksaw apparatus as claimed in claim 12 wherein the clamp means comprises a hydraulic cylinder fixed to the table, a rotatable shaft rotatably mounted within the cylinder and extending above the table, a clamping arm fixed to the upper end of the shaft, the lower end of the shaft extending through a sleeve fixed to the cylinder, the shaft and the cylinder defining an upper chamber and a lower chamber therebetween, adjacent ends of the chambers being separated from each other by third sealing means fixed to the shaft and each chamber being sealed at an opposite end by fourth sealing means, the upper and lower chambers being connectable to a source of pressurized hydraulic fluid, a hollow tube being fixed to a lower end of the sleeve, walls of the tube defining a slot having an upper portion extending both longitudinally and partially circumferentially along the tube and a lower straight portion extending longitudinally, the lower end of the shaft having a pin extending radially outwardly and adapted to fit within the slot.

14. A hacksaw apparatus as claimed in claim 13 wherein the source of operating pressurized hydraulic fluid is a bi-directional pump operated by power means and controlled by an output regulating means, and wherein an upper limit switch means is fixed relative to the table and a lower limit switch means is fixed to the lower end of the shaft, whereby signals may be delivered to the regulating means from the limit switch means according to the position of the hacksaw support structure.

15. A hacksaw apparatus as claimed in claim 14 wherein the hacksaw hydraulic cylinders are connected to a metering check valve means, operable to allow a pre-determined amount of fluid to flow therethrough whereby the hacksaws are operable to move away from the work piece a pre-determined distance during a return stroke and to a pressure regulating valve means, operable to allow a pre-determined pressure to be applied by the hacksaws to the work piece during a cutting stroke.

* * * * *